W. McCONWAY.
Brake-Shoe.

No. 8,255. Reissued May 28, 1878.

Witnesses
C. L. Parker
John E. McCormick

Inventor William McConway
By Attorney George H. Christy

UNITED STATES PATENT OFFICE.

WILLIAM McCONWAY, OF PITTSBURG, PENNSYLVANIA.

IMPROVEMENT IN BRAKE-SHOES.

Specification forming part of Letters Patent No. 199,161, dated January 15, 1878; Reissue No. 8,255, dated May 28, 1878; application filed March 6, 1878.

*To all whom it may concern:*

Be it known that I, WILLIAM McCONWAY, of Pittsburg, county of Allegheny, State of Pennsylvania, have invented or discovered a new and useful Improvement in Car-Brake Shoes; and I do hereby declare the following to be a full, clear, concise, and exact description thereof, reference being had to the accompanying drawings, making a part of this specification, in which like letters indicate like parts.

Figure 1:
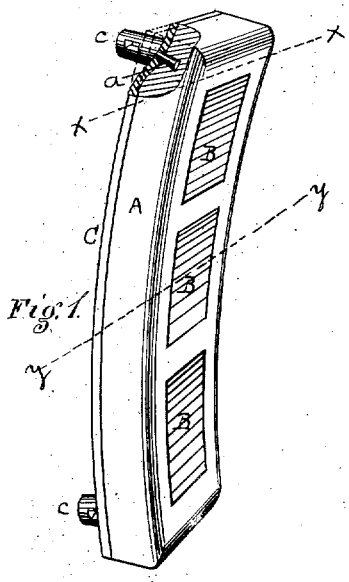
Figure 2:
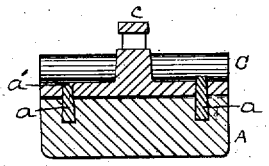
Figure 3:
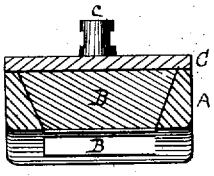
Figure 4:
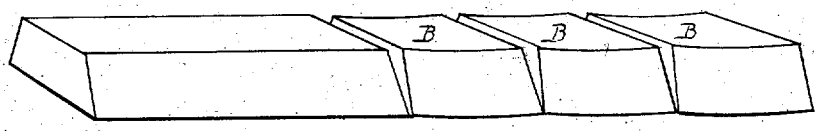

Figure 1 is a perspective view of my improved car-brake shoe, one corner being broken away in part. Fig. 2 is a transverse sectional view through the plane *x x*, Fig. 1. Fig. 3 is a like sectional view through the line *y y*, Fig. 1; and Fig. 4 is an outline perspective view of blocks of metal used in the shoe, as hereinafter described, and also showing a bar or blank from which such blocks may be cut.

My improved brake-shoe belongs in part to that class the face or rubbing-surface of which is composed of two or more metals, or qualities or kinds of the same metal, and also in part to that class in which the rubber or friction block is attached to a separate back-piece. In making brake-shoes of the first class, the method heretofore followed has been to prepare a sand mold in the usual way, and into the mold lay pieces of wrought-iron, steel, or other like metal. Molten cast-iron is then poured in, which covers and more or less fuses with the wrought-metal pieces, thus permanently embedding them in the body of the shoe.

This mode of manufacture is objectionable, because the molten metal, coming in contact with the solid iron, is hardened in cooling, the solid iron acting as a "chill." This chilling or hardening of the shoe renders it liable to cut and wear the tread of the wheel when applied in ordinary use; and also by hardening cast-iron its adhesive or frictional qualities are very much impaired, thus lessening its efficiency when used in brake-shoes.

Another objection to brake-shoes made in this way is that such shoes, when worn out, are practically useless as scrap. This arises from the necessity of separating the different grades of metal, which is difficult and expensive where the different grades are united or fused together in casting, as before described.

By my improvement I secure the advantages derived from using different grades of metal in the shoe. I also obtain a soft cast metal, inclosing the wrought metal in such manner that the different grades may be readily separated, when desired, for scrap.

My improved shoe consists of a cast-iron frame, A, having cavities cast therein, in which are placed blocks B of wrought-iron, steel, or other like metal, and these blocks are secured in place partly by the form of the cavities and partly by a back-piece, C, which is, by preference, made of malleable iron, and is riveted to the back of the frame A, as presently described.

The several parts of my improved shoe are made as follows: An ordinary sand mold is prepared for casting the frame A, within which mold are arranged cores for forming the desired number of cavities in the frame. I prefer to make these cavities extend through the frame from back to face, and pyramidal in form, or of such form that at the base or back of the frame they shall be greater in area than at the face or front. The blocks B can then be put in place and removed only from the back. I also arrange studs or pins *a* (four or more in number) within the mold in such manner that the metal of the frame will be cast around one end of the pins, thus securing them firmly, while the free end will be left to project from the back of the frame far enough to form posts or rivets for securing the back-piece C.

The blocks B may be made by cutting pieces of proper size from a bar, which are swaged or pressed to the desired form to fit the cavities in the frame A. The bar or blank from which these blocks are cut may, however, be rolled to a form in cross-section adapted to a corresponding section, or to two sides of the cavities in the frame, and the blocks cut from such bar may then be swaged or pressed to shape, as before described. Such a bar is shown in the drawings Fig. 4.

The block C is made, by preference, of malleable iron or other like tough material, and has two or more lugs or studs, *c*, or other like devices, projecting from the back, by which the shoe is secured to the brake-shoe block or holder. This back-piece C is made to fit the back of the frame A, as shown in Fig. 1, and the metal used in its construction is manipulated in the manner common in the art.

In securing this back C to the frame A, holes are made through it corresponding to the rivets *a*, and after putting the blocks B in place in the cavities in the frame the back-piece is placed upon the frame with the rivets protruding through the holes. These rivets are then headed, as shown at *a'*, when all parts of the shoe will be bound together and securely held in place.

A brake-shoe constructed as described, so as to bring different grades of metal in the face, will wear much longer than one which is made wholly of cast-iron; and on account of the softness of the cast-metal, which I thus secure, the shoe will operate much more efficiently than one in which the cast metal is chilled or hardened, as has heretofore been done; also, when the shoe becomes worn, the back C may be removed by cutting the rivets *a*, and the worn parts easily separated for scrap, while the back itself may be used again in constructing a shoe of the same type; and in this construction it will be observed that the curvature of the front face of the back C is the same or nearly the same as that of the front face of the rubber or friction-block, the latter, of course, following the curvature of the car-wheels; and that, as a result of this, the entire or nearly the entire rubber or friction block may be utilized before renewal is necessary. A back-piece thus made may, indeed, be used an indefinite number of times, and serve the required purpose equally as well as a new one. Thus my improvement has in view not only increased utility, but also economy.

I am aware that it is not new to make a brake-shoe holder or clog with a face concave through the greater part of its length, to which the rubber or sole is directly attached by suitable fastening devices; but my improvement differs from such construction in this, among other features, that I interpose what I have termed a "back-piece," having a concave seat for the rubber or sole in between the rubber or sole and the holder or clog, and so combine the fastening devices with the back-piece that they will not be destroyed by the wearing out of the rubber or sole.

In prior patents, when the rubber or sole was worn out, the fastening devices by which it was connected to the holder or clog became waste material. By making the fastening devices with or as a part of the back-piece, and riveting the rubber or shoe to the back-piece, so as to be renewable without the destruction of the devices by which connection is made with the holder or clog, I improve the construction and effect a considerable saving in percentage of waste.

I claim herein as my invention—

1. A car-brake shoe consisting of a cast-metal frame, A, having one or more recesses extending through the same from back to face, in combination with insertible blocks B, adapted to the form of such recesses, and a removable back, C, substantially as described.

2. A rubber for car-brake shoes consisting of a cast-metal frame, A, in combination with one or more detached blocks, B, insertible from the rear, substantially as and for the purpose described.

3. In a car-brake shoe, a back-piece, C, adapted to be interposed between and to connect the rubber or sole to the holder or clog, and having a front face or seat conformed nearly or exactly to the curvature of the wheel, in combination with a rubber or sole removably attached thereto, substantially as and for the purposes set forth.

In testimony whereof I hereunto set my hand.

WILLIAM McCONWAY.

Witnesses:
J. J. McCormick,
Claudius L. Parker.